(12) United States Patent
Kamen et al.

(10) Patent No.: US 7,357,202 B2
(45) Date of Patent: Apr. 15, 2008

(54) USER INPUT FOR VEHICLE CONTROL

(75) Inventors: Dean L. Kamen, Bedford, NH (US); Robert R. Ambrogi, Manchester, NH (US); John David Heinzmann, Manchester, NH (US); Richard Kurt Heinzmann, Francestown, NH (US); David Herr, Compton, NH (US); John B. Morrell, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/947,122

(22) Filed: Sep. 22, 2004

(65) Prior Publication Data

US 2005/0034553 A1     Feb. 17, 2005

Related U.S. Application Data

(62) Division of application No. 10/166,553, filed on Jun. 10, 2002, now Pat. No. 6,799,649, which is a division of application No. 09/524,931, filed on Mar. 14, 2000, now Pat. No. 6,443,250.

(60) Provisional application No. 60/124,403, filed on Mar. 15, 1999.

(51) Int. Cl.
    *B62D 61/12*     (2006.01)

(52) U.S. Cl. .................. 180/65.1; 180/335; 180/7.1; 701/93

(58) Field of Classification Search ............ 180/8.1, 180/315, 335, 65.1; 701/94, 93
See application file for complete search history.

(56) References Cited

U.S. PATENT DOCUMENTS

| | | | |
|---|---|---|---|
| 3,814,199 A | | 6/1974 | Jones |
| 4,284,929 A | * | 8/1981 | Garrett et al. .............. 318/51 |
| 4,511,825 A | * | 4/1985 | Klimo ..................... 318/67 |
| 4,942,737 A | * | 7/1990 | Tatsumi .................. 60/431 |
| 5,214,916 A | * | 6/1993 | Lukich .................... 60/431 |
| 5,248,007 A | * | 9/1993 | Watkins et al. ........... 180/9.32 |
| 5,529,134 A | * | 6/1996 | Yomogita ................ 180/6.2 |
| 5,592,817 A | * | 1/1997 | Nishimura et al. .......... 60/431 |
| 5,630,756 A | | 5/1997 | Thurston et al. |
| 5,635,807 A | * | 6/1997 | Lautzenhiser ............. 318/625 |
| 5,648,897 A | * | 7/1997 | Johnson et al. ............ 700/83 |
| 5,649,422 A | * | 7/1997 | Baginski et al. ........... 60/431 |
| 5,701,965 A | * | 12/1997 | Kamen et al. ............. 180/7.1 |
| 5,831,596 A | | 11/1998 | Ashraf et al. |
| 6,052,644 A | * | 4/2000 | Murakami et al. .......... 701/93 |
| 6,112,612 A | * | 9/2000 | Seksaria et al. ....... 74/471 XY |
| 6,155,648 A | * | 12/2000 | Dombek et al. ........... 298/1 C |
| 6,250,844 B1 | * | 6/2001 | Sartler et al. ............. 404/112 |

* cited by examiner

*Primary Examiner*—Kevin Hurley
(74) *Attorney, Agent, or Firm*—McCormick, Paulding & Huber LLP (57) ABSTRACT

A user input for controlling acceleration of a vehicle. The user input has a movable member capable of deflection by a user such that a degree of deflection corresponds to a specified velocity commanded by the user. The correspondence between the degree of deflection and the specified velocity may include a plurality of zones, each zone characterized by a distinct sensitivity that may be capable of customization for a specific user. The user input may also include a neutral position of the movable member, wherein a substantially sudden motion of the movable member to the neutral position causes a slewed slowing of the vehicle.

5 Claims, 8 Drawing Sheets

USER INPUT FOR VEHICLE CONTROL

CROSS REFERENCE TO RELATED APPLICATIONS

The present application is a divisional application of application Ser. No. 10/166,553, now allowed, filed Jun. 10, 2002, now U.S. Pat. No. 6,799,649 which claims priority from Ser. No. 09/524,931, filed Mar. 14, 2000 and issued as U.S. Pat. No. 6,443,250 on Sep. 3, 2002, which, in turn, claimed priority from U.S. Provisional Application Ser. No. 60/124,403, filed Mar. 15, 1999, each of which applications is incorporated herein by reference in its entirety.

TECHNICAL FIELD

The present invention pertains to methods for control of the configuration and motion of a personal vehicle, equipped with one or more wheels or other ground-contacting members, by a person carried on the vehicle or by an assistant.

BACKGROUND OF THE INVENTION

Personal vehicles (those used by handicapped persons, for example), may require stabilization in one or more of the fore-aft or left-right planes, such as when no more than two wheels are in ground contact at a time. Vehicles of this sort may be more efficiently and safely operated employing control modes supplementary to those described in the prior art. A personal vehicle may be referred to in this description, interchangeably, as a "transporter."

SUMMARY OF THE INVENTION

In accordance with a preferred embodiment of the invention, there is provided a vehicle for transporting a payload over a surface that may be irregular and may include stairs. The vehicle has a support for supporting the payload and a ground contacting element movable with respect to a local axis, where the local axis can be moved with respect to some second axis that has a defined relation with respect to the support. The vehicle also has a motorized drive arrangement for permitting controllable motion of the ground contacting element so as to operate in an operating condition that is unstable with respect to tipping in at least a fore-aft plane when the motorized drive arrangement is not powered. The vehicle also has an input device for receiving an indication from an assistant who is not disposed on the vehicle of a direction of desired motion of the vehicle.

In accordance with other embodiments of the invention, the input device for receiving an indication from an assistant may be a handle coupled to the support, and the handle may be extensible.

An input device may be provided for receiving an indication from a user specifying a configuration of the vehicle, the specified configuration including at least one of seat height, vehicle lean, vehicle direction, and vehicle speed. The input device may further include a user command device for receiving an indication from the user of at least one of a desired movement and a desired configuration of the assembly.

In accordance with further alternate embodiments of the invention, the vehicle may also include an assistant-override for disabling the user command device while the vehicle is controlled by an assistant. The user command device may include a joystick.

In accordance with another aspect of the invention, in accordance with preferred embodiments, there is provided a method for enabling a subject to ascend and descend stairs with assistance by an assistant. The method has a first step of providing a device having a support for supporting the subject, a ground contacting element movable with respect to a local axis, the local axis being movable with respect to a second axis having a defined relation with respect to the support, and a motorized drive arrangement for permitting controllable motion of the ground contacting element so as to operate in an operating condition that is unstable with respect to tipping in at least the fore-aft plane when the motorized drive arrangement is inoperative. The method has subsequent steps of maintaining wheel torque against each riser successively and changing the relation of the local axis with respect to the support so as to maintain the center of gravity of the device and the subject between specified limits in forward and rearward directions of rotation of the device.

In accordance with other embodiments of the present invention, there is provided a user input for controlling acceleration of a vehicle. The user input has a movable member capable of deflection by a user such that a degree of deflection corresponds to a specified velocity commanded by the user. The correspondence between the degree of deflection and the specified velocity may include a plurality of zones, each zone characterized by a distinct sensitivity. The user input may also include a neutral position of the movable member, wherein a substantially sudden motion of the movable member to the neutral position causes a slewed slowing of the vehicle. The specified velocity may have fore-aft and lateral components.

In accordance with other alternate embodiments of the invention, a user input may be provided having a movable member capable of deflection by a user such that a degree of deflection corresponds to a specified velocity commanded by the user, the correspondence between the degree of deflection and the specified velocity having a plurality of zones, each zone characterized by a distinct sensitivity. The distinct sensitivity of each zone may be capable of customized specification by the user or for the user.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Personal vehicles designed for enhanced maneuverability and safety may include one or more clusters of wheels, with the cluster and the wheels in each cluster capable of being motor-driven independently of each other. Such vehicles are described in U.S. Pat. Nos. 5,701,965, 5,971,091, 6,302,230, 6,311,794, and 6,553,271 and in copending U.S. patent application Ser. No. 09/325,976, all of which patents and which application are incorporated herein by reference.

Figure 1:
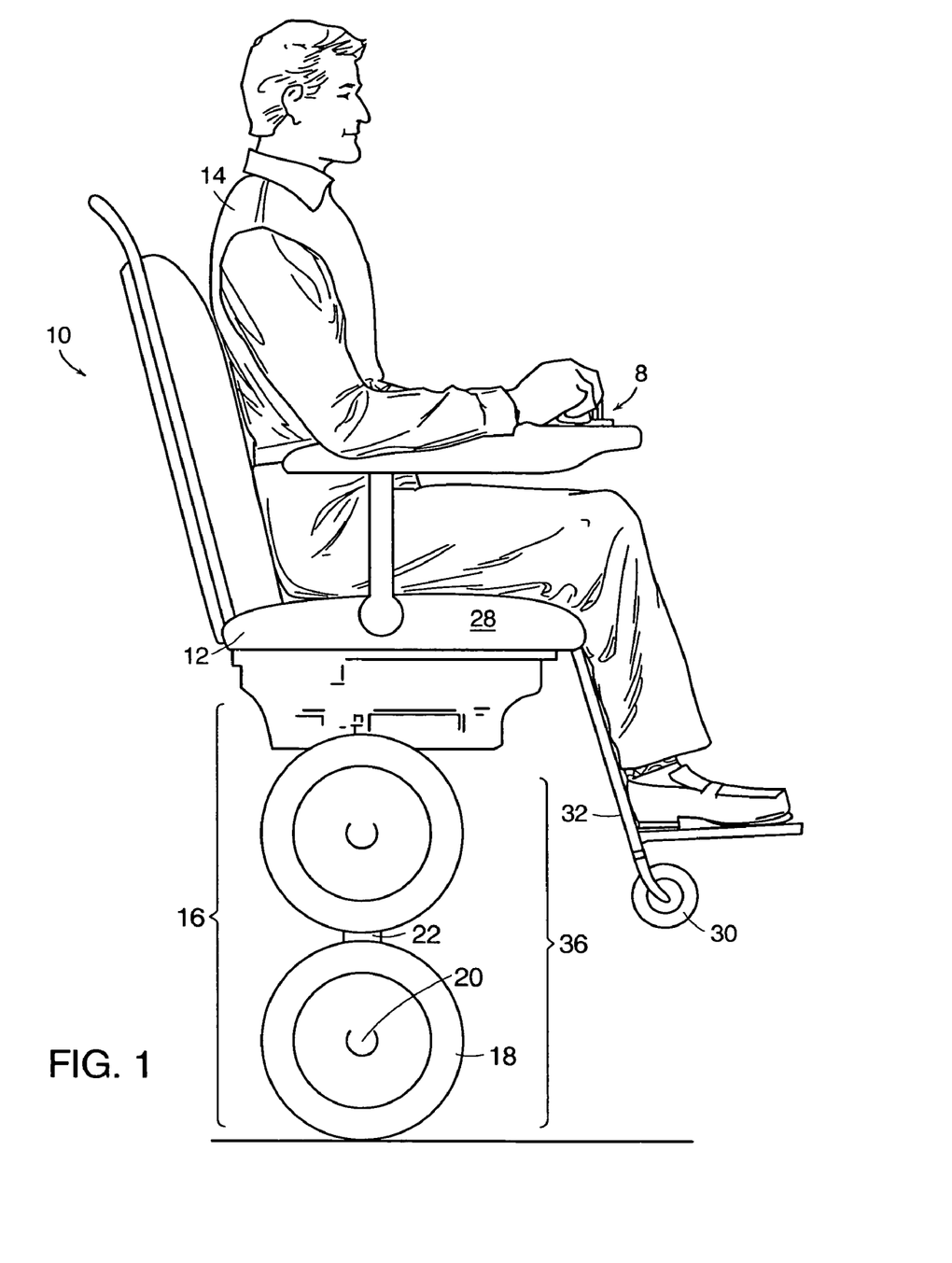
FIG. 1 is a side view of a prior art personal vehicle of the type in which an embodiment of the invention may be advantageously employed.

Referring to FIG. 1, the personal vehicle, designated generally by numeral 10, may be described in terms of two fundamental structural components: a support 12 for carrying a passenger 14 or other load, and a ground-contacting module 16 which provides for transportation of support 12 across the ground, or, equivalently, across any other surface. The vehicle further includes a motorized drive arrangement 21 for driving the ground contacting elements 18. The passenger or other load may be referred to herein and in any appended claims as a "payload." As used in this description and in any appended claims, the term "ground" will be understood to encompass any surface upon which the vehicle is supported.

Referring further to FIG. 1, the modes of operation described herein apply to vehicles having one or more ground-contacting elements 18, where each ground-contacting element is movable about an axis 20 and where the axis corresponding to a ground-contacting member can itself be moved. For example, ground-contacting element 18 may be a wheel, as shown, in which case axis 20 corresponds to an axle about which the wheel rotates.

Motion of axes 20 of respective ground-contacting elements is referred to in this description and in any appended claims as "cluster motion." Wheels 18 may be movable in sets, with the moving assembly referred to as a cluster 36. Cluster motion is defined with respect to a second axis 22, otherwise referred to as a "cluster joint." Additional driven degrees of freedom may be provided, such as motion of the second axis about one or more pivots which may, in turn, allow the height of seat 28 to be varied with respect to the ground. Alternatively, seat height may be varied by means of a telescoping post, or by means of any other mechanical artifice. Pivot 26 (shown in FIG. 2) may also be referred to herein as a "knee joint." An actuator (not shown) may be associated with each driven degree of freedom and controlled using control strategies discussed in detail below. In preferred embodiments of the invention, the actuators include wheel servo-motors and cluster servo-motors, with current supplied to the respective motors by servo amplifiers. Additionally, non-driven wheels may be provided, such as casters 30 coupled to footrest 32 or otherwise to support 12.

Figure 2:
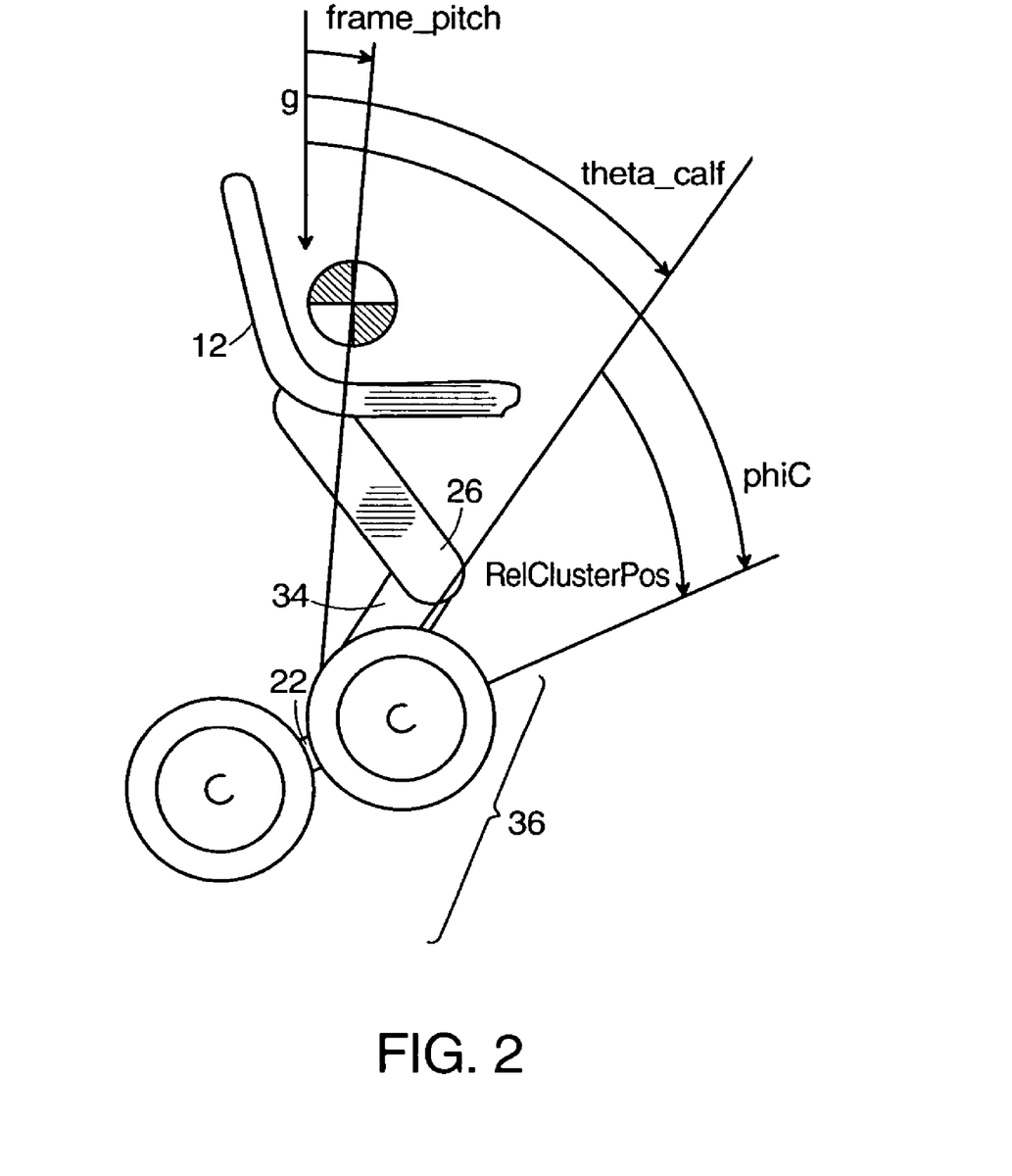
FIG. 2 is a diagram of typical components of a personal vehicle of the type in which an embodiment of the invention may be advantageously employed indicating the variables used in the description of specific embodiments of the present invention.

For purposes of the following description, variables describing the orientation and configuration of personal vehicle 10 are shown schematically in FIG. 2. It is to be understood that the configuration of FIG. 2 is shown by way of example and not by way of limitation. The configuration of FIG. 2 includes an additional linkage 34 between the second axis 22 and support 12, where linkage 34 may also be referred to herein as a "calf." As shown in FIG. 2, frame_pitch is the angle, measured from the center of gravity CG to the vertical axis, designated g. In balancing mode (see below), frame_pitch is measured between the CG and the contact point on the ground. In 4-wheeled modes, frame_pitch is typically the angle of the CG with respect to cluster joint 22 and may be derived from a measurement of theta_calf (see below) and knowledge of the machine configuration.

theta_calf is the angle of calf 34 with respect to gravity.

RelClusterPos is the position of cluster 36 relative to calf 34.

phiC is the angle of cluster 36 with respect to gravity, which may be obtained by adding theta_calf to RelClusterPos.

Other variables may be derived for purposes of description and control algorithms:

theta_ref_4_wheels is the angle of calf 34 with respect to gravity that would place the estimated CG directly over cluster joint 22. This angle changes when the seat height changes since calf 34 may move in order to keep the CG over the cluster joint 22. theta_balance is the balance angle, and equals the calf angle (theta_calf) required to place the estimated CG over one wheel. There may be two balance angles for some cluster orientations, such as when four wheels are on the ground.

theta_des_user is the correction applied to the control loop to accommodate a user-commanded change in CG or pitch.

RelClusterPos_dot is the velocity of the cluster relative to the calf. Generally, "_dot" refers to the time-rate-of-change of a variable, and "_hat" refers to a filtered variable.

Input of user instructions, whether of a person being conveyed by the personal vehicle or of an attendant, may be provided by means of an input device 8 (shown in FIG. 1) such as a joystick or other device for directional control, and buttons or switches for other commands. User instructions inputted via the input device may include commands with respect to both the motion of the vehicle, such as its direction and speed, as well as commands with respect to the configuration of the vehicle, the operational mode, the height of the vehicle seat or the angle of lean of the seat. In accordance with a preferred embodiment of the invention, the input device may be joystick that may be mounted on the vehicle, or may be detachable, as described in U.S. Pat. No. 6,405,816. Alternatively, the input device may be a force handle providing for control of the vehicle by a person currently dismounted from the vehicle, such as a person preparing to transfer to the vehicle from an automobile, for example.

Joystick Processing

Preprocessing of commands provided by a user for control of a vehicle by means of a control input device are now discussed with reference to FIGS. 3a-3c. Such commands may be applicable in any of various modes of operation of a mechanized vehicle. Description with respect to a "joystick" is by way of example only, however other input devices are within the scope of the present invention as described herein and as claimed in any appended claims.

Figure 3A:
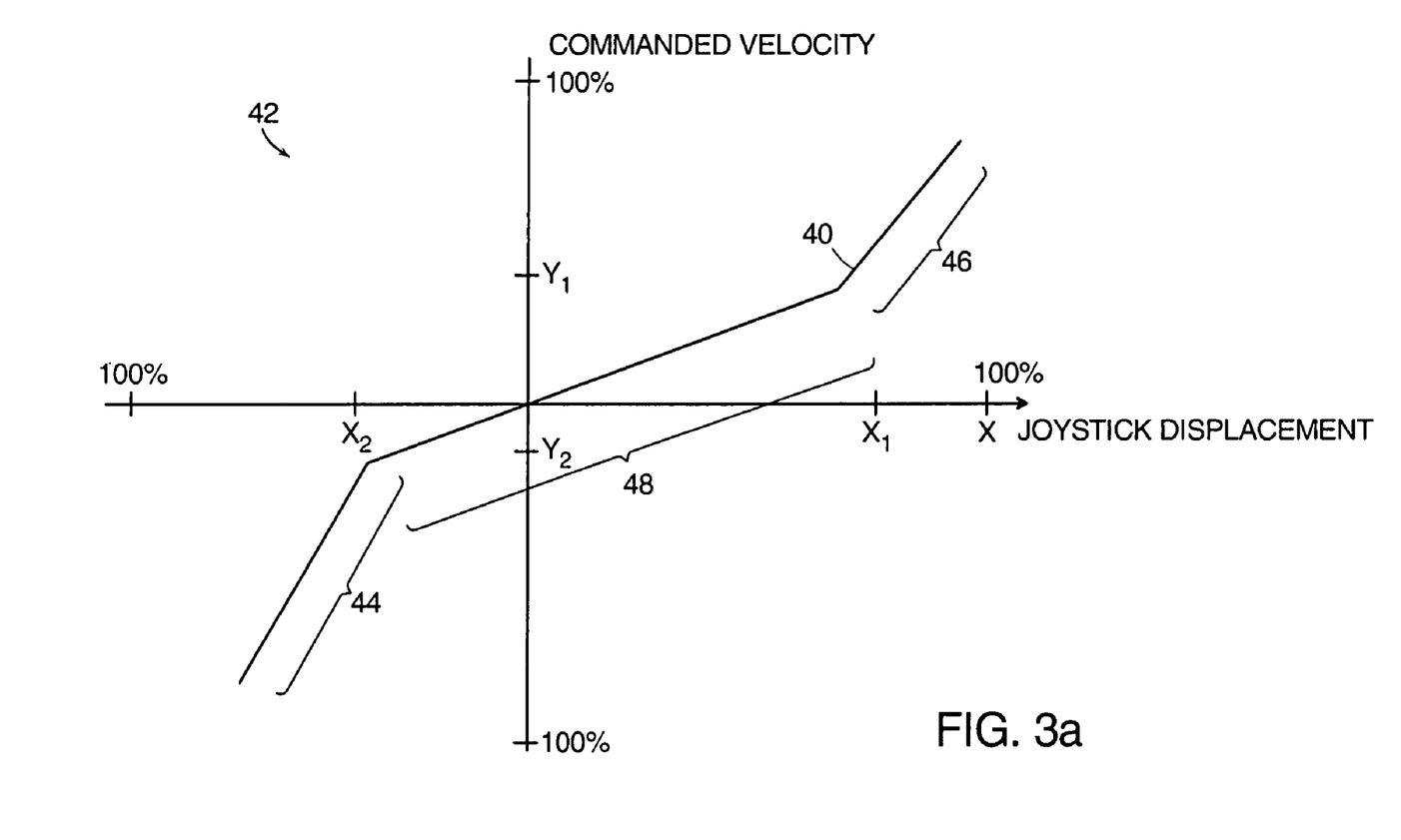
FIG. 3a is a plot of commanded velocity of a vehicle as a function of the displacement of a joystick or other user input, showing a variable transmission input control in accordance with an embodiment of the present invention.

Referring to FIG. 3a, a commanded velocity 40 is plotted as a function of displacement x as depicted along the horizontal axis of plot 42. The control provided by a control input is well-defined as long as each displacement of a member which may be varied by the user is mapped to a unique commanded velocity. In fact, a more general displacement-to-commanded velocity law may be provided in which hysteresis is allowed and the correspondence of a commanded velocity to displacement of the member depends on the past history of the joystick displacement, x(t), where t is time. In accordance with an embodiment of the present invention; the commanded velocity may be implemented by the vehicle over time, with the acceleration slewed within the confines of specified limits, as known to persons skilled in the control arts. Such slewing advantageously eliminates the need for tremor damping of the vehicle.

In accordance with the control law depicted in plot 42, three regions of distinct linear mapping laws are shown. In regions 44 and 46, commanded velocity 40 varies as a more rapid function of displacement of the joystick, or movable member, while in central region 48, commanded velocity varies more slowly with joystick displacement, thereby allowing improved control of the vehicle in tighter environments. The joystick thereby exhibits an effectively variable transmission ratio, with the ratio configurable by the user, for example, for operating parameters customized for indoor and outdoor operation. Similarly, all joystick modes described herein may be separately customized for different operation in the various control modes of a vehicle. The control law may be any specified functional relationship within the scope of the present invention.

Figure 3B:
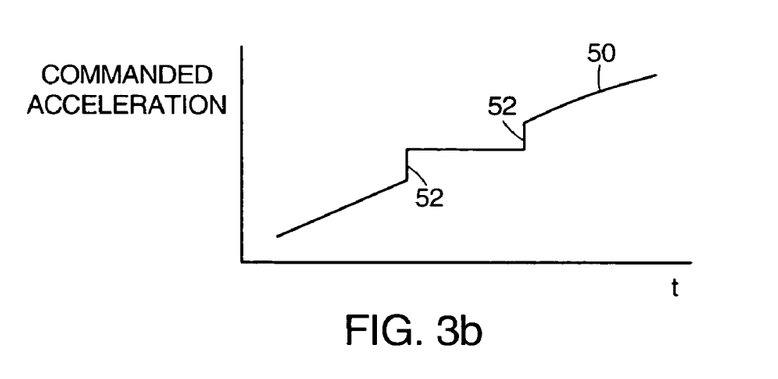
FIG. 3b is a plot of commanded acceleration as a function of time showing discontinuities corresponding to deadband regions.
Figure 3C:
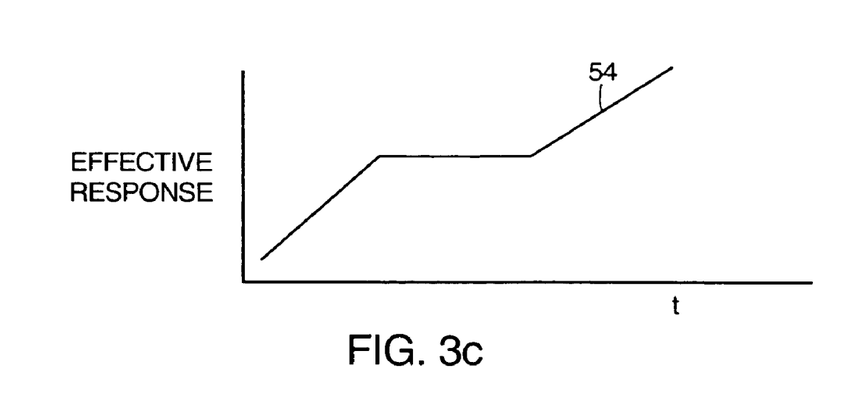
FIG. 3c is a plot of the effective acceleration in response to the commanded acceleration of FIG. 4b, in accordance with an embodiment of the present invention.

Referring to FIG. 3b, in which commanded acceleration 50 is shown for a typical time-sequence of joystick motion, regions 52 correspond to a deadband wherein joystick displacement occurs and no joystick output is produced. In accordance with an embodiment of the present invention, deadband region 52 is removed from the joystick command so that smooth transitions out of the deadband area are produced, as shown in FIG. 3c. Thus, for example, if the deadband region is 20 units large, a requested joystick command of 30 units results in an acceleration equal to 10 units.

Displacement of the joystick may occur in both fore-aft (x) and lateral (y) directions, resulting in corresponding components of a commanded velocity and/or acceleration. In accordance with an embodiment of the invention, commanded x and y components may be coupled so as to limit the x component based on the current y component, for example. Thus, velocity may be limited during sharp turns.

In accordance with other embodiments of the invention, user input displacements may be overridden, and commanded velocities limited, via software of otherwise, on the basis of specified vehicle parameters. Thus, for example, commanded velocity may be limited on the basis of battery voltage, seat height, frame angle, or other parameters. Similarly, the return of the joystick to a neutral position may be programmed to result in a gradual braking of the vehicle, whereas hard braking may be achieved by deflection of the joystick backwards past the neutral position.

Remote Mode

A remote mode is used to facilitate the transfer of the user to and from the vehicle. The vehicle is controlled, via a remote control device, without the user being seated in the vehicle. In accordance with preferred embodiments of the invention, the remote device is the user control interface 8 itself, which may be decoupled mechanically from the vehicle as described in detail in copending U.S. application Ser. No. 09/325,463. Communication of data between user control interface 8 and vehicle 10 may be via extensible cable, for example. Alternatively, communication of data may be via wireless electromagnetic waves, including radio or infrared waves, for example. In a preferred embodiment of the invention, the user command interface 8 is readily disconnected from the armrest of the vehicle by means of an asymmetrical quick disconnect mechanism.

A sensor may be used to verify that the user is not seated in the vehicle. In remote mode, the controller resets the gain to a very low value and resets the configuration parameters such as maximum speed and acceleration to values lower than the default values. The low gains allow the vehicle to be moved and positioned with less force than would be required were the gains set to their default values. The remote control device may additionally require the activation of a failsafe device such as the depression of a specified button, which may be disposed on the control device, in order for the command to be accepted by the controller while in remote mode.

Assisted Stair Mode

The stair mode allows a user to climb stairs independently, as described in detail in copending U.S. Pat. No. 6,311,794, or with the assistance of an able-bodied person. The ascent may be controlled by the user leaning and/or pulling on a handrail, and the user may specify the seat height and lean angle of the supporting vehicle. Cluster rotation is controlled on the basis of the position of the CG, whether governed by action of the user or of an assistant.

In stair mode, the wheel servo loop and cluster servo loop are substantially decoupled. The goal of the wheel loop is to drive the wheels back against the stair risers without excessive torque, keeping the transporter in position while preventing motor or amplifier overheating. The goal of the cluster loop, in accordance with this embodiment, is to keep the center of gravity of the vehicle, including the user, between the front and rear wheels at all times. An additional goal, subsidiary to that of stabilization, is to reduce the force needed by the user to travel up and down stairs.

The control law applied by both wheel and cluster controls in stair mode uses a high-bandwidth servo loop modified by lower frequency inputs. This ensures that the controller remains stable in the presence of various environmental disturbances. Additionally, the dynamics of the wheels and clusters may be decoupled, for control purposes, into a number of identifiable configurations, and appropriate correction terms may be applied to the control law within the scope of the invention, so as to provided improved performance under various operating conditions.

Operation of the cluster controller is now described with reference to the stair climbing mode. The force required to perform stair climbing is related to how close the user can put the overall center of gravity of the transporter and user over the wheel that is currently stationary or that leads to the desired direction of travel. If the user can keep the CG over this wheel (either by trunk lean or cluster deflection) then the requisite forces are lower.

The act of climbing may be viewed as a gait with four distinct dynamic phases: Initiation, Swing, Relaxation, and Placement. During Initiation, stair climbing is initiated. At first, the transporter has four wheels on the surface. As the cluster starts to rotate, one pair of wheels leaves the surface, defining Initiation.

Swing is the phase of stair climbing wherein the cluster rotates through the first half of its trajectory, i.e., between the stair tread and vertical position of the cluster, such that, on ascending stairs, potential energy increases. It begins at Initiation and ends when the cluster is vertical. Potential energy decreased during Relaxation—between the point at which the cluster is vertical and the point at which all four wheels again contact the stairs. During Placement, four wheels are on the stairs, and the frame of the transporter is being repositioned to begin another step.

The basic cluster control law, $$\text{ClusterVoltage} = K_p * \text{PitchError} - K_d * \text{ClusterVelocity}$$

is modified, in accordance with a preferred embodiment of the stair climbing mode, to address the following issues:

a. The user CG needs to be held over the back wheel while the transporter is ascending.
b. Similarly, the user (or assistant), on descent, needs to place the frame sufficiently in the forward direction as to move the CG over the front wheel.
c. A single mode for both ascent and descent is preferred.
d. Friction compensation may be provided to reduce the effect of stick-slip chatter in the cluster transmission.

The augmented control law, in accordance with a preferred embodiment of the invention, is:

$$\text{ClusterVoltage} = K_p * \text{PitchError} - K_d * \text{ClusterVelocity} + K_{p1} * \text{RearError} + K_{p1} * \text{FrontError},$$

where RearError and FrontError are zero when the CG is between the front and rear angle limits, which are shown in FIG. 8. RearError and FrontError become non-zero when the CG pitch angle crosses either angle limit. The pitch gain, $K_{p1}$, for the limit errors is much larger than the ordinary pitch gain $K_p$. Thus, in effect, the spring which holds the frame upright becomes much stiffer when one of the angle limits is crossed. This causes the cluster to rotate. By moving the front and rear angle limits as a function of cluster position, the placement of the CG may be controlled. When the rear limit and the front limit come together, then the cluster moves to a precise location based on the calf angle. When the limit angles are further apart, the cluster becomes more passive and the system is more dissipative.

With respect to the wheel controller in stair mode, the wheel controller acts as a one-way clutch, or, alternatively, as an electronic ratchet, with a dead band which prevents excessive torque from being developed against successive stair risers.

In an assisted stair mode, a personal vehicle may be controlled by an assistant who may apply external guiding signals, thereby supplanting the role of input provided by a subject being transported by the vehicle. The mode of operation has been described with reference to the stair mode to which the assist mode is identical, with lean input being provided by the assistant. In assist mode, the gains used in the enhanced mode are reduced and configuration parameters such as maximum speed and acceleration are lowered. This allows the vehicle to be moved and positioned with less force from the assistant or the rider. In addition, an assist mode safety device (such as an electric switch) may be provided such that the safety device must be activated by the assistant before the mode may be entered. The safety device may be, for example, a button 96 (shown in FIG. 4) disposed on the rear of the seat backrest such that the assistant may easily press the button and activate the mode, while making it difficult for the rider to do the same. In another embodiment, the button may be placed on an assistant seat handle.

Figure 4:
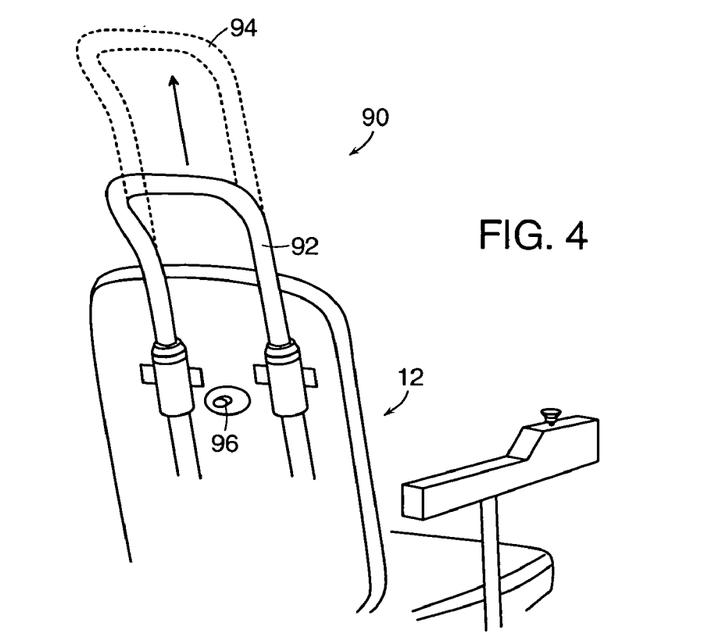
FIG. 4 is a rear view of the personal transporter of FIG. 1 showing an extensible handle used in an assist mode of vehicle control in accordance with an embodiment of the invention.
Figure 5:
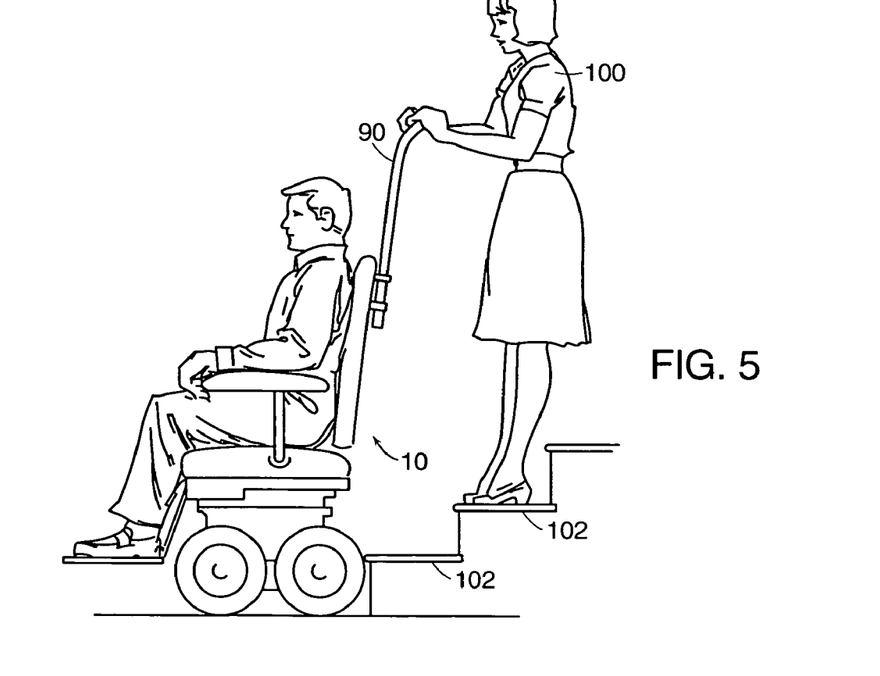
FIG. 5 is a side view of a personal transporter indicating the use of an assist mode of vehicle control in accordance with an embodiment of the invention.

An assistant may, for example, guide a person, seated in a personal vehicle, up or down a flight of stairs. Referring now to FIG. 4, the input of an assistant may be via mechanical guidance of the vehicle, such as via extensible handle 90 coupled to support 12. Handle 90 is shown in a retracted position 92 and in extended position 94 as designated by dashed lines. FIG. 5 shows a side view of personal vehicle 10 after assistant 100 has raised extensible handle 90 to a comfortable level, in preparation for ascending steps 102.

Figure 6A:
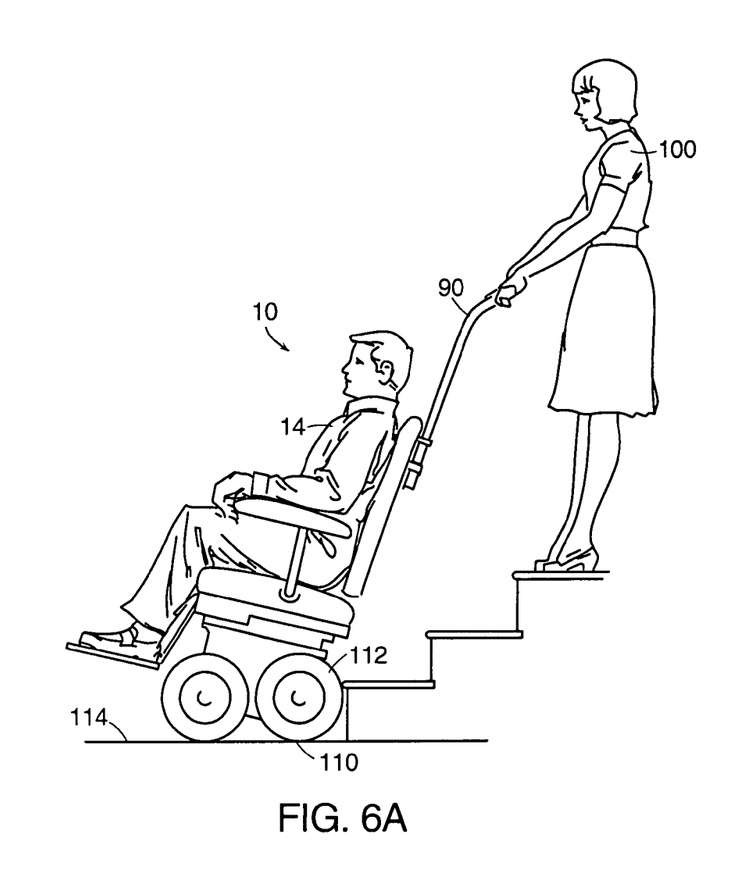
FIGS. 6A-6D show successive steps in the sequence of climbing stairs with the aid of a personal transporter operated in an assist mode of vehicle control in accordance with an embodiment of the invention.
Figure 6B:
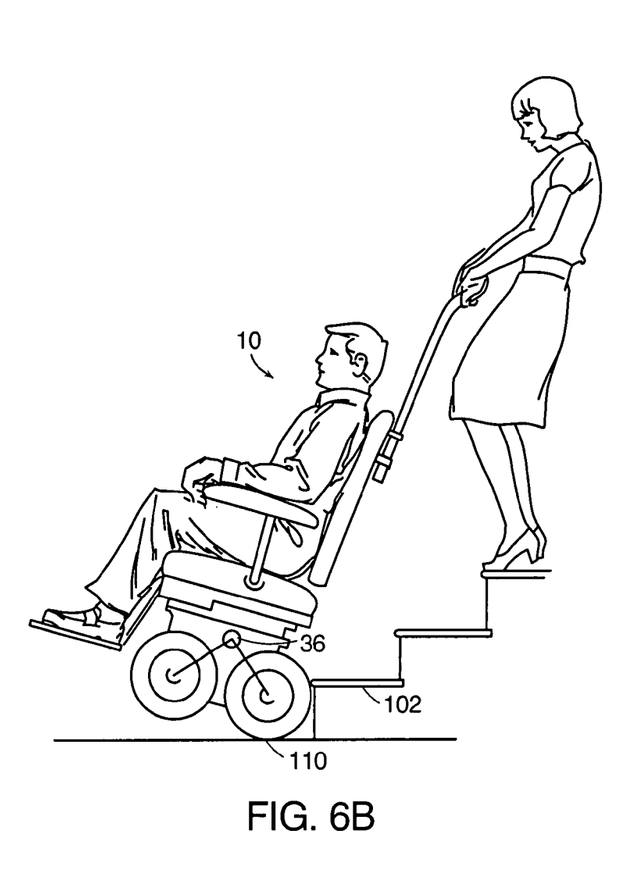
Figure 6C:
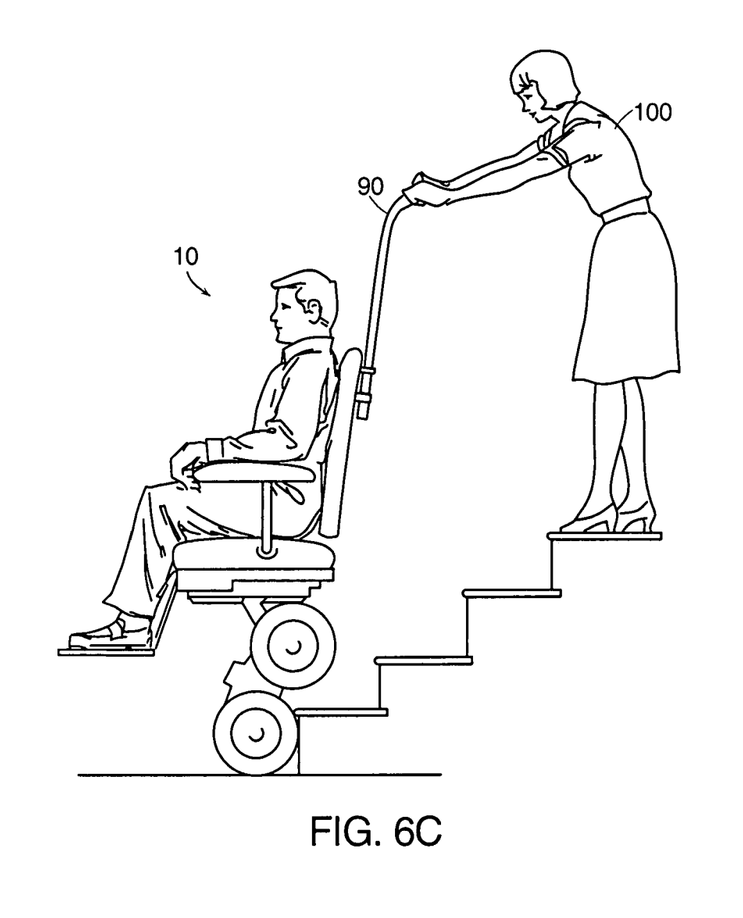
Figure 6D:
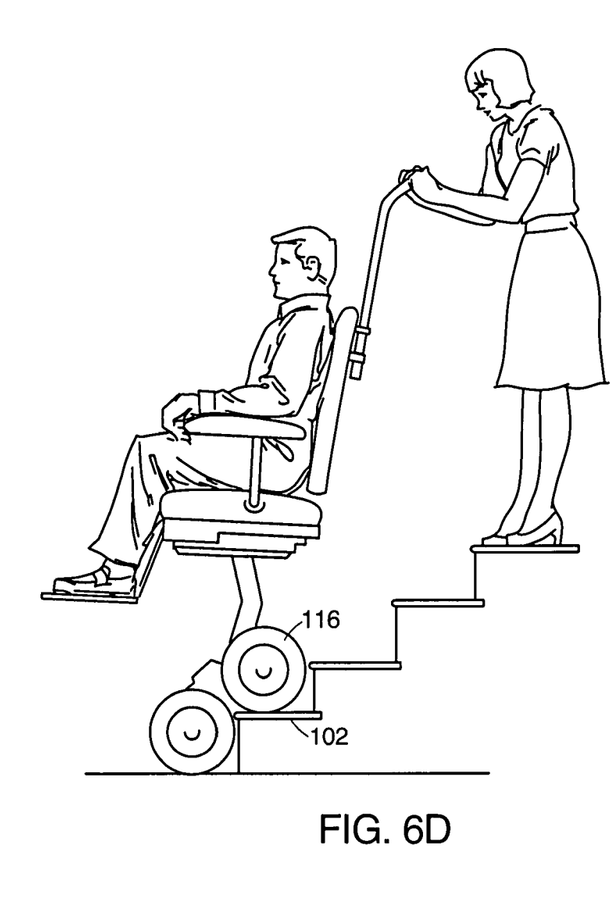

The sequence of assisted stair ascension in accordance with a preferred embodiment of the invention is now discussed with reference to FIGS. 6A-6D. In FIG. 6A, assistant 100 is shown applying rearward pressure to handle 90 in order to move the center of gravity (CG) of vehicle 10, including subject 14, to a position over or aft of point of contact 110 between rear wheel 112 and surface 114 (which may be referred to herein and in any appended claims as the "ground"). Referring now to FIG. 6B, vehicle 10 responds to the shift of the CG to a position above or aft of contact point 110, vehicle by rotating cluster 36 in a direction (clockwise in the figure) as to ascend step 102. FIG. 6C shows assistant 100 applying a forward force on vehicle 10 via handle 90 so as to move the CG of the vehicle in a forward direction. FIG. 6D shows wheel 116 in contact with step 102, whereupon the process may be repeated for ascending subsequent steps.

Individual Cluster Legs

Figure 7:
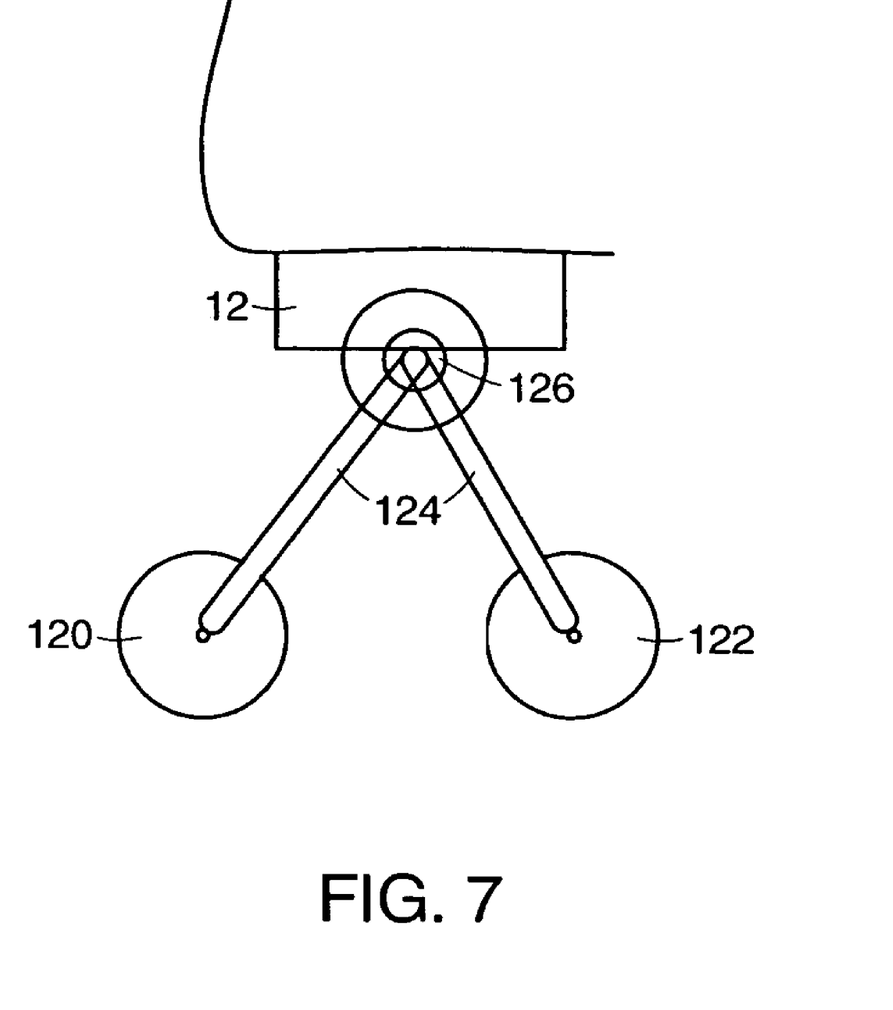
FIG. 7 is a side view of a personal transporter employing an individual cluster leg configuration in accordance with an alternate embodiment of the present invention.

Referring now to FIG. 7, an alternate embodiment is shown of a personal vehicle of a sort which may be controlled by the control modes described herein. In accordance with this embodiment, wheels 120 and 122 are not jointly rotated about a cluster joint but may instead be mounted on members 124 individually rotatable about one or more axes at one or more pivots 126 which may be fixed with respect to support 12. The functionalities described above, and in the preceding transporter patent applications incorporated herein by reference, with respect to cluster motion may be achieved, alternatively, by a loop controlling the scissor action of wheel support members 124.

The described embodiments of the invention are intended to be merely exemplary and numerous variations and modifications will be apparent to those skilled in the art. All such variations and modifications are intended to be within the scope of the present invention as defined in the appended claims.

We claim:

1. A vehicle propelled by a motorized drive for transporting the vehicle across a surface, the vehicle comprising:
a movable member spanning a range of deflection by a user, each deflection corresponding to a unique non-zero velocity commanded by the user; and
a balance-maintaining controller for maintaining balance of the vehicle on the basis of a servo loop governing the motorized drive in accordance with user commands of a specified non-zero velocity.

2. A vehicle according to claim 1, wherein correspondence between the degree of deflection and the unique velocity includes a plurality of zones, each zone characterized by a distinct sensitivity.

3. A vehicle according to claim 1, wherein the movable member is further characterized by a neutral position and wherein the controller governing the motorized drive is of the kind that causes a slewed slowing of the vehicle upon a substantially sudden motion of the movable member to the neutral position.

4. A vehicle according to claim 1, wherein the specified velocity has fore-aft and lateral components.

5. A vehicle according to claim 1, wherein each degree of deflection of the movable member over the range of deflection corresponds to a unique specified non-zero velocity commanded by the user, the correspondence between the degree of deflection and the specified velocity having a plurality of zones, each zone characterized by a distinct sensitivity in accordance with which the controller governs the motorized drive.

* * * * *